July 6, 1965            R. D. SMITH            3,193,326
AUTOMOBILE BABY SEAT
Filed Sept. 11, 1963                          3 Sheets-Sheet 1
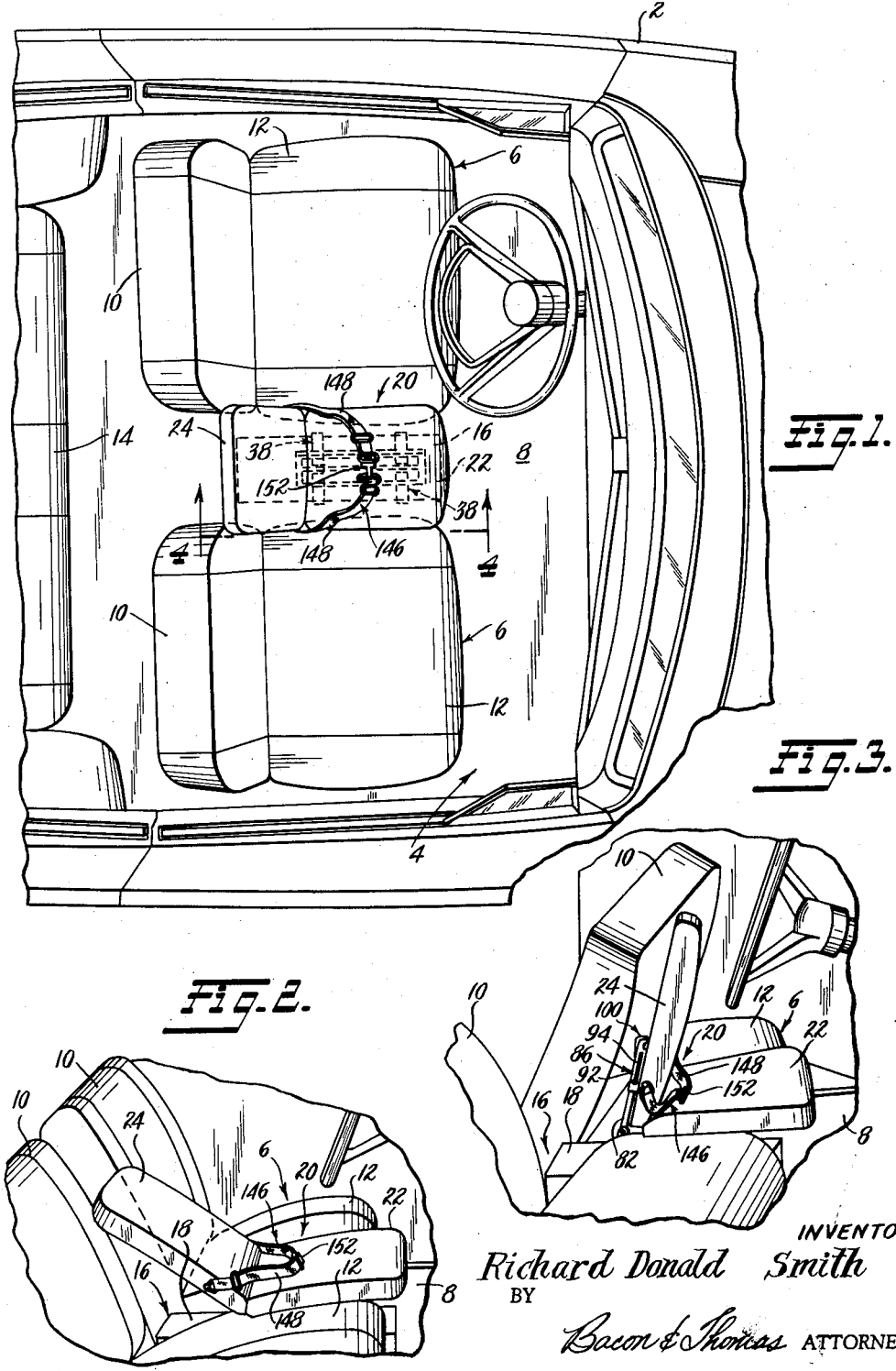
INVENTOR
Richard Donald Smith
BY
Bacon & Thomas ATTORNEYS July 6, 1965 R. D. SMITH 3,193,326
AUTOMOBILE BABY SEAT
Filed Sept. 11, 1963 3 Sheets-Sheet 2
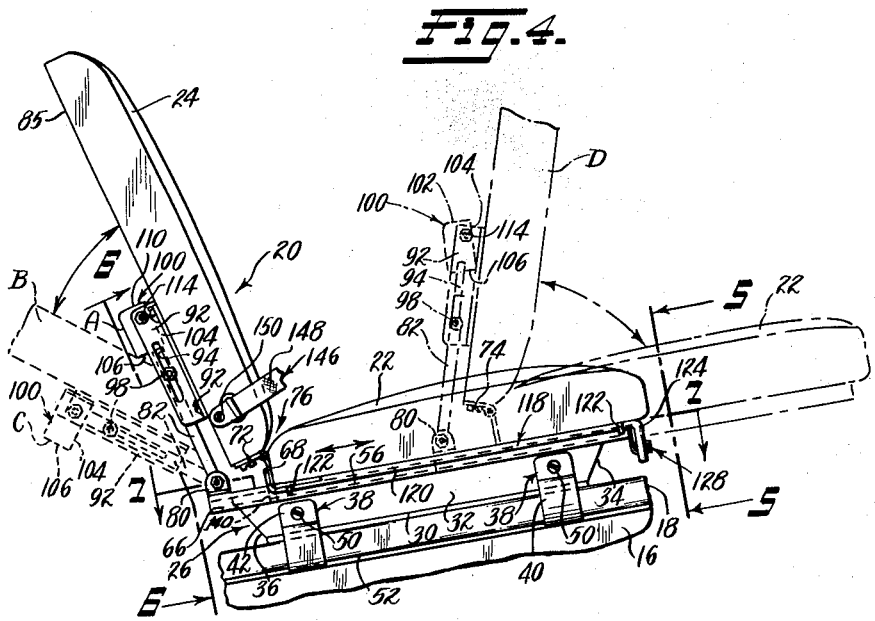
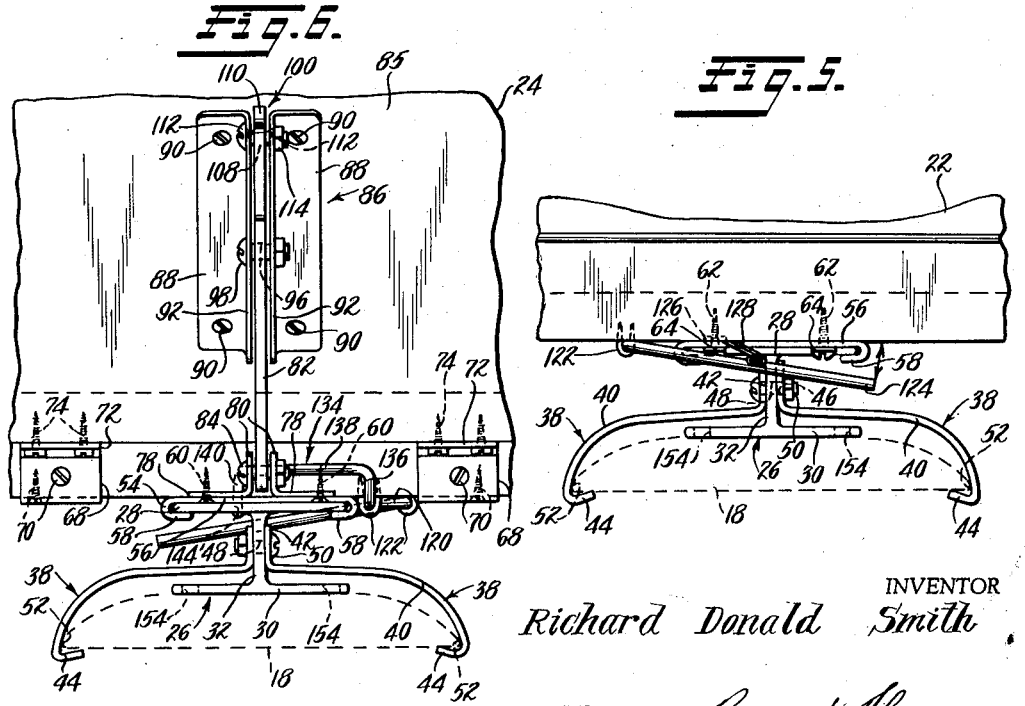
INVENTOR
Richard Donald Smith
BY Bacon & Thomas
ATTORNEYS July 6, 1965  R. D. SMITH  3,193,326
AUTOMOBILE BABY SEAT
Filed Sept. 11, 1963  3 Sheets-Sheet 3
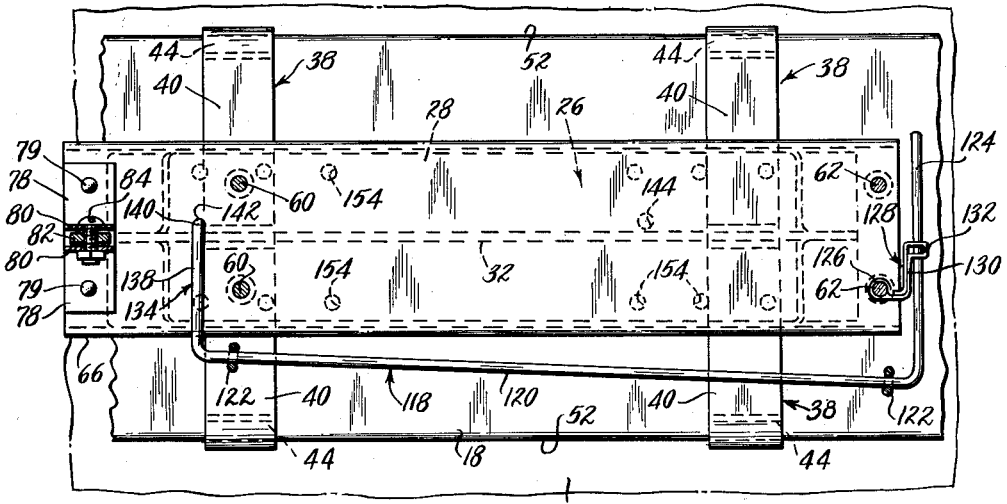
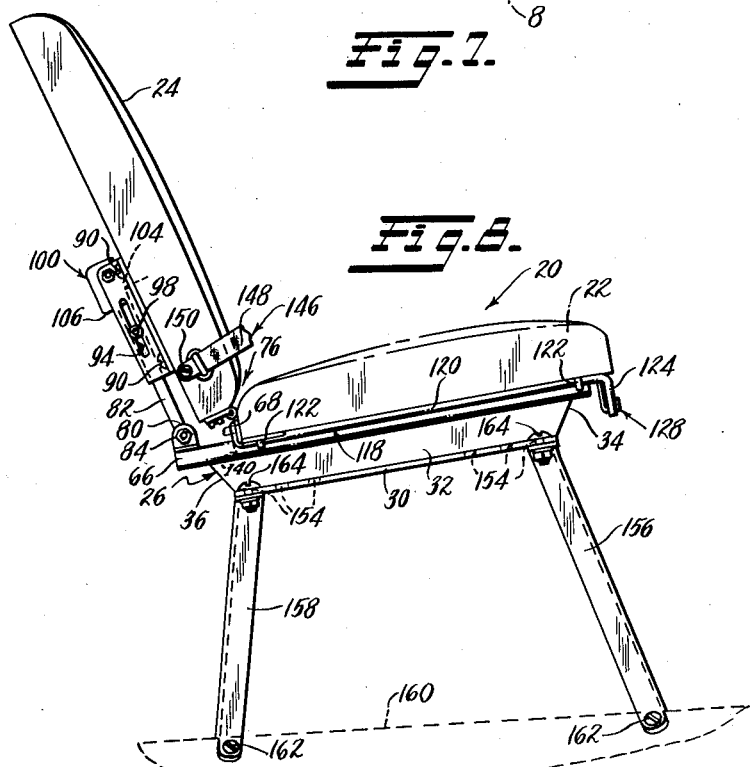
INVENTOR
Richard Donald Smith
BY
Bacon & Thomas
ATTORNEYS

United States Patent Office 3,193,326
Patented July 6, 1965

3,193,326
AUTOMOBILE BABY SEAT
Richard Donald Smith, 3¼ Miles N. Bentsen Road,
McAllen, Tex.
Filed Sept. 11, 1963, Ser. No. 308,130
17 Claims. (Cl. 297—257)

This invention relates generally to baby seats for use in automobiles, and more particularly to an improved baby seat that is mountable between bucket or individual front seats of an automobile. More particularly, the present baby seat is constructed to permit ready forward tilting of the back rests of such front seats to provide access to the rear seat for the automobile.

The desire to provide a seat for a baby or a small child in an automobile has led to the development of numerous types of seats for this purpose. A common method for mounting such seats is to merely suspend them by hook-like brackets from the top of the back rest portion of the front seats, an arrangement usually satisfactory in automobiles having non-tilting, continuous front seats. However, the provision of a baby seat in automobiles having tilting, spaced, individual, or bucket type front seats presents special problems. Because each individual bucket-type seat is designed to accommodate only one person, there is usually no excess portion of the back rest available from which to suspend the conventional type of baby seat.

The baby seat of the present invention is intended for mounting between the spaced, individual, or bucket front seats of an automobile without attachment to either seat. It can be mounted either on the automobile floor, or on the drive shaft tunnel, or it can be mounted by suitable clamps upon the lid of a console positioned between the two front seats. Also, suitable legs can be used as a mounting means where most feasible.

The present baby seat is slidably mounted upon a rail that is secured in the automobile between the front seats. Means are provided to secure the baby seat in a plurality of positions on the rail, and when the baby seat is so secured it is firmly mounted against accidental displacement or against movement caused by sudden automobile acceleration or deceleration. The baby seat can be slid forwardly on the rail, or tilted forwardly, when it is desired to enter the rear of the automobile, whereby either of the front seat back rests can be readily swung forwardly without interference.

The present baby seat includes a base portion and a back rest portion, the latter being pivotally connected at its lower end to the rear edge of the seat portion. A unique means is provided for supporting the back rest of the baby seat in a plurality of angular positions relative to the seat. The back rest of the baby seat can be readily swung forwardly to facilitate forward swinging movement of the back rest of either of the front seats.

A further feature of the present baby seat is that it can be readily removed from its supporting rail and mounted upon additional rails in environments other than in automobiles. A soft but adequate safety belt is connected with the back rest to safeguard a child while the baby seat is in use.

It is an object of this invention to provide a baby seat for use in automobiles having spaced, tilting, front seats, and which seats are constructed to be readily mountable within said automobile, and to offer a minimum of interference to the normal operation of the individual seats.

Another object is to provide an automobile baby seat constructed to remain firmly in position during operation of the automobile.

A further object is to provide an automobile baby seat constructed so that the back rest thereof can assume a plurality of angular positions relative to the base of the seat.

It is also an object to provide a slide rail mechanism for a baby seat, constructed to provide easy installation and removal of the baby seat, and to provide for adjustment in the positioning thereof.

Another object is to provide an automobile baby seat adaptable for use elsewhere, as in homes, outdoors, etc.

A further object is to provide supporting mechanism for the back rest of a baby seat, constructed to support said back rest in a plurality of angular positions relative to the seat base, and to be readily operable to change the back rest from one angular position to another.

Other objects and many of the attendant advantages of the present invention will become readily apparent from the following detailed description, when considered in connection with the accompanying drawings, wherein:

FIG. 1 is a fragmentary plan view of a convertible automobile having individual, spaced bucket type front seats therein, and showing the baby seat of the invention installed for use between the front seats;

FIG. 2 is a fragmentary perspective view of the front seats of the automobile of FIG. 1, showing the baby seat with its back rest in a reclining position;

FIG. 3 is a similar view, but showing the manner in which the back rest of the baby seat automatically swings forwardly as the back rest of one of the front seats is swung forwardly;

FIG. 4 is an enlarged, fragmentary, side elevational view of the baby seat as seen along the line 4—4 of FIG. 1.

FIG. 5 is a fragmentary elevational view of the front end of the baby seat as seen along the line 5—5 of FIG. 4;

FIG. 6 is a fragmentary elevational view of the rear end of the baby seat as seen along the line 6—6 of FIG. 4;

FIG. 7 is an enlarged fragmentary, horizontal sectional view taken along the line 7—7 of FIG. 4, showing the construction of the locking lever apparatus; and FIG. 8 is a side elevational view of a baby seat showing the baby seat rail mounted upon legs.

Referring now to the drawings, a convertible automobile is indicated generally at 2, said automobile having the top thereof (not shown) lowered to expose the front portion of the passenger compartment 4. The passenger compartment 4 contains a pair of spaced, individual bucket-type front seats 6, secured to the floor 8 of the automobile, each seat including a back rest 10 arranged to be swung forwardly over the seat base 12 to provide access to the rear seat 14 of the automobile. The individual, or bucket seats 6 are each of a size to accommodate one passenger, and spaced apart a distance sufficient to accommodate, for example, a console 16.

The console 16 contains a storage compartment, and has a lid 18 pivotally attached thereto (FIGS. 4 to 6), said lid being hinged to the console 16 along its rear edge. Secured to the lid 18, and hence supported by the console 16, is a baby seat 20. The baby seat 20 includes a base 22 and a back rest 24, the back rest and the seat being upholstered and padded in any suitable manner. The baby seat 20 is mounted upon a rail 26, which has a generally I-shaped transverse cross-section.

The rail 26 includes a top flange 28 and a bottom flange 30, said flanges 28 and 30 being interconnected by a vertical web 32. As is best shown in FIG. 4, the opposite ends 34 and 36 of the rail 26 are cut back at an angle, so that the top flange 28 thereof extends beyond both ends of the bottom flange 30. The bottom flange 28 of the slide rail 26 rests upon the lid 18 of the console 16, and is secured thereto by a plurality of clamps or mounting brackets 38.

As is best shown in FIGS. 5 and 6, the mounting brackets 38 each comprise two arcuate sections 40 having a vertical flange 42 at the upper inner end thereof, and an inturned lip 44 at the lower, outer end thereof. The flanges 42 have bores 46 extending therethrough, and the bracket sections 40 are mounted in opposing relation with the flanges 42 on the opposite sides of the vertical web 32. The vertical web 32 has spaced bores 34 therethrough positioned in alignment with the bores 46, and the bracket sections 40 are secured to the vertical web 32 by bolts 50 extending through the aligned bores. The inturned lips 44 on the outer lower end of the bracket sections 40 are engaged over the lateral edges 52 of the console lid 18, whereby the rail 26 is secured to said lid in a desired position of adjustment relative to said lid.

The baby seat base 22 has a slide member or shoe 54 secured to the undersurface thereof, said slide member being mounted medially of said seat base, and having its longitudinal axis parallel with the longitudinal axis of said seat base. The slide member 54 comprises a plate 56 having inturned, generally U-shaped lateral edges 58 thereon, the inturned edges 58 being engageable with the lateral edges of the top flange 28 of the rail 26. The slide 54 is secured to the seat 22 near the aft end thereof by a pair of screws 60 (FIGS. 6 and 7), said screws having a head seated within countersunk bores in the lower face of the plate 56, whereby to present a smooth, uninterrupted surface to the top flange 28.

The slide 54 is secured to the front end of the seat 22 by a pair of screws 62 (FIGS. 5 and 7). The screws 62 pass through bores in the plate 56, are threaded into the lower side of the seat 22, and have projecting filister heads 64. The screws 62 are aligned on an axis extending transversely of the longitudinal axis of the slide 54, and the heads 64 project downwardly from the plate 56 to constitute a pair of stops which will engage the forward edge of the top flange 28 for limiting the extent to which the slide 54 can be moved rearwardly on the rail 26.

The seat base 22 has the lower half 68 of a pair of spaced strap hinges secured to the aft end thereof by screws 70. The hinge halves 68 are angle-shaped and disposed on either side of the projecting slide portion 66, and terminate near the top, rear edge of the seat portion 22. The angle-shaped hinge halves 68 are secured by the screws 70 to both the rear edge and the bottom face of the seat 22 and provide a rigid mounting for the strap hinges. The baby seat back rest 24 has mating hinge halves 72 secured to the bottom edge thereof by screws 74. The hinge halves 68 and 72 are interconnected by the usual hinge pins. Thus, the back rest 24 can be pivoted forwardly and rearwardly through a wide angular range relative to the seat 22, a clearance 76 being provided between the adjacent edges of the seat and back rest to facilitate such pivotal movement.

The projecting slide portion 66 has a pair of spaced angle brackets 78 secured thereto by rivets 79 (FIGS. 6 and 7), said angles including a pair of confronting upstanding legs 80. The lower end of a slide bar 82 is received between the legs 80, and is pivotally secured thereto by a bolt 84, which passes through aligned bores in the legs 80 and the slide bar 82.

Secured to the rear surface 85 of the back rest 24, above the projecting slide portion 66, is a bracket assembly 86, best shown in FIGS. 4 and 6, which includes a pair of generally vertically disposed angle irons 88 secured in spaced, parallel relationship to the back rest 24 by screws 90. The angle irons 88 include a pair of upstanding flanges 92 having confronting, generally vertically extending slots 94 therein. The slots 94 extend lengthwise of the flanges 92 and parallel with the rear surface 85 of the back rest 24.

The upper end of the slide bar 82 is received between the flanges 92, and has a bore 96 extending therethrough. A bolt 98 is passed through the confronting slots 94 and the bore 96, and constitutes a pivot pin for securing the upper end of the slide bar 82 to the bracket assembly 86. It is thus seen that the pivot bolt 98 will travel up and down the slot 94 when the back rest 24 is tilted forwardly and rearwardly. The length of the slots 94 is sufficient to permit the back rest 24 to tilt forwardly over the seat base 22 a substantial distance, and to permit operation of a pivoted stop member 100 in a manner described hereinafter.

The stop member 100 comprises an elongated rectangular plate 102, having a forward edge 104 and a bottom edge 106 disposed at right angles to each other. The plate 102 has a bore 108 therethrough located near the upper end of the forward edge 104 and spaced inwardly a short distance from said forward edge. The bore 108 is also positioned inwardly of a top edge 110 a distance equal to about one-quarter of the total length of the forward edge 104.

The flanges 92 have confronting bores 112 therein near the upper end thereof, and in alignment with the slots 94. A pivot bolt 114 passes through the confronting bores 112 and the bore 108, and pivotally secures the stop member 110 between the flanges 92. As is best seen in FIG. 4, the bores 112 are spaced from the upper end of the slots 94 a distance such that the bottom edge 106 of the plate 102 will project downwardly a short distance beyond the upper end of the slots 94 when the stop member 100 is in the position shown in full lines at A in FIG. 4. The slots 94 and bores 112 are spaced outwardly from the rear surface 85 of the back rest 24 a distance sufficient to provide a clearance between the stop member 100 and the rear surface 85 of said back rest, such that the stop member 100 is free to pivot about the bolt 114.

The stop member 100 is engageable with the upper end of the slide bar 82, the slots 94 being sufficiently long to permit said upper end of said slide bar to engage with either the forward edge 104 or the bottom edge 106 of said stop member.

The stop member 100 functions in the following manner:

Referring to FIG. 4, the normal position for the stop member 100 is as shown in full lines at A, with the bottom edge 106 thereof disposed between the slots 94. The bracket 86 and the slide bar 82 are proportioned so that the back rest 24 of the baby seat 20 will be inclined rearwardly from the seat base 22 at an angle comfortable for normal seating when the bottom edge 106 of the stop member 100 is in the position shown at A.

When it is desired to move the seat back rest 24 to a reclining position, indicated by broken lines at B in FIG. 4, the stop member 100 is pivoted outwardly so that the forward edge 104 thereof will face toward the slots 94 (this position for the stop member is indicated in dot-and-dash lines at C in FIG. 4). The seat back rest 24 is then pivoted rearwardly, until the upper end of the slide bar 82 engages with the stop edge 104. Because the bores 112 are aligned with the slots 94, the upper end of the slide bar 82 will impinge directly upon the confronting edge of the stop member 100, and will not cause said stop member to pivot inadvertently. Thus, the back rest 24 will remain in its inclined position until readjusted. When it is desired to return the back rest 24 to its normal position, shown in full lines in FIG. 4, all that is necessary is to grasp said back rest and swing it forwardly. As the upper end of the slide bar 82 disengages the stop member 100, said stop member will pivot by gravity from the position shown at C to the position shown at A. This occurs automatically because of the eccentric pivotal mounting for the stop member 100. When the back rest 24 is swung forwardly over the seat 22, as indicated in broken lines at D in FIG. 4, the stop member 100 will remain with its bottom edge 106 between the slots 94, and the back rest 24 will be supported in the position shown in full lines in FIG. 4 when it is again inclined slightly rearwardly. It is thus seen that a unique back rest locking assembly has been provided, which is automatic in operation incidental to manipulation of the back rest 24, and which can be easily manipulated with but one hand.

The seat 20, as has been mentioned, is slidably receivable upon the rail 26, and can be slid rearwardly thereon until the screw heads 64 engage the front edge of the top flange 28. The baby seat 20 is further provided with an adjustable locking apparatus to secure the seat 20 in a desired position on the rail 26. Referring in particular to FIGS. 5 to 7, the seat locking mechanism includes a locking member 118 secured to the undersurface of the seat base 22.

The locking member 118 includes a longitudinally extending portion 120, which is rotatably supported adjacent the undersurface of the seat base 22 by a pair of spaced staples 122 positioned near the opposite ends thereof. The portion 120, as is best seen in FIG. 7, is mounted to extend forwardly, and laterally outwardly from the rear end of the slide 54, whereby it extends at a slight angle lengthwise of the rail 26. As is best seen in FIG. 5, the front end of the portion 120 of the locking member 118 has an actuator arm, or handle, 124 extending transversely therefrom and located in front of the forward end of the slide 54. A loop end 126 of a resilient, stiff wire spring 128 is wrapped around one of the screws 62, and is disposed between the plate 56 and the bottom surface of the seat 22. The spring 128 includes a downwardly inclined arm 130 terminating in a tip 132 which is engageable over the handle 124. The spring 128 thus functions to bias the handle 124 downwardly, as is best shown in FIG. 5.

The aft end of the portion 120 has an arm 134 extending transversely therefrom, as is best shown in FIG. 6. The arm 134 includes a generally vertically extending portion 136 that is arranged to lie at an angle of about 105° clockwise from the plane of the handle 124, as viewed in FIG. 6. The arm 134 is positioned rearwardly from the aft edge of the seat base 22, and further includes a portion 138, which projects toward and overlies the slide 54 and extends at right angles to the portion 136. The arm 134 terminates at its free end in a downwardly projecting locking tip 140. The transverse portion 138 has a length greater than one-half the width of the rail flange 28, whereby the locking tip 140 is disposed on the side of the web 32 opposite to the portion 120 of the locking member 118.

The projecting slide portion 66 has an opening 142 through which the tip 140 of the locking arm 134 extends. The flange 28 of the rail 26 has a plurality of spaced bores 144 therethrough adjacent the web 32, positioned to register with the bore 142 and the tip 140 as the seat base 22 is slid longitudinally of the rail 26. While only two bores 144 are shown in FIG. 7, it is to be understood that any desired number can be employed, whereby the seat 20 can be locked in any one of a plurality of different positions along the length of the rail 26.

The operation of the locking member 118 is as follows: When the seat 22 is removed from the slide rail 26, the spring 128 will urge the handle 124 downwardly, whereby the tip 140 will project through the bore 142. Before the slide 54 can be moved a substantial distance onto the top flange 28 of the rail 26, the handle 124 must be lifted upwardly to raise the tip 140 sufficiently to permit the flange 28 to pass therebeneath. Because the handle 124 is positioned at the front center of the seat base 22, this operation can be easily accomplished.

The seat 20 is then slid rearwardly on the rail 26 until the desired position therefor is reached, at which time the tip 140 will be in alignment with one of the spaced bores 144. The handle 124 is then released, and the tip 140 enters a confronting bore 144 to securely lock the seat 20 in position on the rail 26.

As has been mentioned, the baby seat 20 is constructed for use in automobiles having individual, or bucket, front seats. Usually, these seats include a tilting back rest which must be swung forwardly to permit entry into the rear of the automobile. The baby seat 20 is constructed to facilitate this operation, and the manner in which this is accomplished is illustrated in FIGS. 3 and 4.

Initially, the seat 20 is installed on the rail 26, and is usually slid rearwardly until the screw heads 64 engage the forward end of said rail. The tip 140 of the locking member 118 is arranged to engage with one of the bores 144 when the seat is in this position, which position is illustrated in FIGS. 1 and 4 in full lines.

When it is desired to enter the rear of the automobile, the handle 124 is raised, if necessary, and the seat 20 is slid forwardly on the rail 26 to the position shown in full lines in FIG. 3, and in broken lines at D in FIG. 4. A bore 144 is positioned to be engaged by the locking tip 140 when the seat 20 is in this forward position, and thus functions to lock the seat against accidental displacement from the rail 26. The back rest 10 of either one of the seats 6 can then be readily tilted forwardly, as is shown in FIG. 3.

As the bucket seat back rest 10 engages the back rest 24 of the baby seat 20, the latter will be automatically pivoted forwardly over the seat base 22, as shown in FIG. 10. The slots 94 are sufficiently long to permit the back rest 10 of the front seat 6 to be swung fully forward, whereby to provide unobstructed access to the rear seat 14 of the automobile 2. After the front back rest 10 has been manually returned to its initial position, the baby seat back rest 24 is also manually returned to the position shown in full lines in FIG. 4, with the pivoted stop member 100 being moved by gravity to bring the bottom edge 106 thereof into position between the slots 94. The handle 124 can then be again manipulated to unlock the seat 20, and the seat can be slid rearwardly until the enlarged screw heads 64 once again engage the forward end of the track 26. The handle 124 is released and the tip 140 is engaged within the rearmost bore 144. It is thus seen that an auto baby seat has been provided which incurs a minimum of interference with the normal operation of the front car seats 6.

The manner in which the baby seat back rest 24 can be lowered to the reclining position indicated at B in FIG. 4 has been described hereinabove. When it is desired to so recline the back rest 24, the handle 124 is first lifted, and the seat 20 is slid forwardly to the position shown in FIG. 2 and indicated at D in FIG. 4. The bore 144 is provided to lock the seat 20 in this position. The back rest 24 can then be moved to its reclining position without interfering with the back rests 10 of the front seats 6. When it is desired to again restore the seat 20 to its normal, erect position, the back rest 24 is merely tilted forwardly, as described hereinabove. The seat 20 can then again be slid rearwardly on the rail 26, or it can be left in its forward position, if desired.

The baby seat 20 is provided with a safety belt 146, comprising a pair of flexible strap members 148 having one end thereof secured by a screw 150 to the lower, lateral edges of the back rest 24. The free end of the strap members 148 are detachably connected together by a conventional buckle 152. It is readily apparent that the safety belt 146 will secure a small child to the baby seat 20, and will not interfere in any way with the operation of said baby seat.

It is to be understood that while the baby seat 20 has been described as being attached to the lid 18 of a console 16, it could be mounted otherwise, if desired. For example, the rail 26 could be secured directly to the floor or drive shaft tunnel of an automobile not having a console therein. For this purpose, the bottom flange 30 is provided with a series of spaced openings 154 (FIGS. 5 to 7) for reception of suitable securing screws or bolts. Likewise, the rail 26 can, if desired, be directly fastened to the console lid 18 by fasteners extending through the openings 154. In such event, the clamping brackets 38 can be omitted.

While the baby seat 20 of the invention can be secured to the floor or drive shaft tunnel of an automobile, this is not always possible or practicable, but the problem can be met by mounting the back seat 20 on legs.

Referring to FIG. 8, the baby seat 20 is shown mounted upon a rail 26, identical to that shown in FIGS. 1 to 7. Secured to the opposite corners of the lower flange 30 of the slide rail 26 are the upper ends of inclined front and back legs 156 and 158, respectively. The legs 156 and 158 include angular tips at their upper and lower ends, and are secured to the drive shaft tunnel 160 of an automobile by bolts 162. The upper ends of the legs 156 and 158 are secured to the lower flange 30 by bolts 164 which pass through selected openings 154. Obviously, numerous other means for mounting the rail 26 will suggest themselves.

While the baby seat 20 has been described with reference to use in an automobile, it is readily apparent that it could be also used elsewhere. For example, the rail 26 could be provided with a bracket suitable for clipping over the seat of a household chair, or over the seat of a bleacher stand at a ball park. The baby seat 20 could then be mounted on such rail, whereby a suitable seat for a small child is readily provided. It is also apparent that by utilizing a plurality of rails 26, each for a different intended use of the baby seat 20, one baby seat 20 can be readily transferred from one rail to another to fulfill a variety of requirements.

The rail 26 is usually mounted in a somewhat permanent manner within an automobile. When the baby seat 20 is not mounted thereon, the upper flange 28 of the rail 26 can function as an arm rest, or can be utilized to mount other suitable attachments thereon. Thus, the flexibility of the components of the present invention is again apparent.

Obviously, many modifications and variations of the invention are possible in the light of the above teachings. It is, therefore, to be understood that within the scope of the appended claims, the invention may be practiced other than as specifically described.

I claim:

1. A baby seat structure, comprising: a seat; a back rest; means hingedly securing the lower end of said back rest directly to the rear end of said seat; a slide member fixed upon the lower side of said seat, said fixed slide member including a channel extending in a direction from the rear end toward the front end of said seat, and further including a portion projecting rearwardly beyond said seat; a rail including a portion received within said channel and supporting said slide member for movement along said rail lengthwise thereof; releasable locking means carried by said seat and engageable with said rail for positively locking said seat in different predetermined, fixed positions along said rail, said seat being removable by sliding it off one end of said rail when said locking means is released; and means connected between said rearwardly projecting portion of said slide member and said back rest arranged to provide for free tilting movement of said back rest forwardly over said seat from any rearward position thereof, and for limited movement of said back rest in the opposite direction to a stationary reclining position.

2. A baby seat, comprising: a seat; a back rest pivotally connected along its lower edge to the rear edge of said seat; a seat-mounting member secured to said seat and extending in a direction from the rear towards the front of said seat and having a portion projecting rearwardly beyond said rear edge of said seat; bracket means secured to the rear side of said back rest, said bracket means including: at least one generally vertically disposed flange, said flange having an elongated slot therein; and a stop member pivotally connected to said flange above said slot; and slide bar means extending between said projecting member and said bracket means, said slide bar means comprising: an elongated bar pivotally connected at its lower end to said projecting portion; and pin means projecting laterally from the upper end of said elongated bar and received within said slot, the upper end of said bar being engageable with said stop member, said slide bar means and said bracket means being adjustable to support said back rest in a plurality of angular positions relative to said seat.

3. A baby seat as recited in claim 2, wherein said stop member is moveable between a first position, wherein the lower edge thereof extends for a first distance toward the upper end of said slot, and a second position, wherein the front edge thereof extends for a second distance toward the upper end of said slot, said first distance being substantially less than said second distance.

4. A baby seat as recited in claim 3, wherein said stop member is pivotally mounted to be moved by gravity, when not in engagement with said elongated slide bar, from said first position to said second position.

5. A baby seat as recited in claim 2, wherein said slot has a length sufficient to extend a substantial distance below said pin when said back rest is in a substantially vertical position, whereby said back rest can be pivoted forwardly over said seat.

6. A baby seat, comprising: a rail; a seat; a back rest pivotally connected along its lower edge directly with the rear edge of said seat; a slide member fixed to the underside of said seat, said slide member including a portion projecting rearwardly from said seat, and said slide member being mounted upon said rail for sliding movement therealong; and means connected between said rearwardly projecting portion of said slide member and said back rest, said means being adjustable to support said back rest in any one of a plurality of rearwardly inclined angular positions relative to said seat, and being arranged so that said back rest can be freely pivoted forwardly over said seat from any rearwardly inclined position thereof; and releasable locking means arranged to cooperate with said seat and said rail, and operative to positively lock said seat in different positions along said rail, said seat being removable by sliding it off one end of said rail when said locking means is released.

7. A baby seat as recited in claim 6, wherein said rail has a plurality of longitudinally spaced locking bores therein, and wherein said means for selectively securing said seat to said rail includes a locking lever secured to the underside of said seat, said locking lever comprising: a longitudinally extending portion; a locking arm on one end of said portion including a locking tip receivable within said locking bores; and a handle on the other end of said portion operable to move said locking tip into and out of said locking bores.

8. A baby seat structure, comprising: a rail to be secured to a supporting structure; a seat, a back rest pivotally connected along its lower edge directly with the rear portion of said seat; a slide member fixed to the underside of said seat and receivable on said rail for sliding movement therealong, said slide member having a portion projecting beyond the rear end of said seat; releasable locking means arranged between said seat and said rail, operative to positively lock said seat in different positions along said rail, said seat being removable by sliding it off one end of said rail when said locking means is released; and means extending and connected between said projecting slide member portion and said back rest, said means being adjustable to support said back rest in any one of a plurality of rearwardly inclined angular positions relative to said seat and being arranged so that said back rest can be freely pivoted forwardly over said seat from any rearwardly inclined position thereof.

9. A baby seat as recited in claim 8, wherein the rail has a plurality of longitudinally spaced locking bores therein, and wherein said means operative to positively lock said seat in different positions includes a locking lever, comprising: a longitudinal portion supported for rotation at the underside of said seat, a locking arm on one end of said portion, and including a tip selectively receivable in said locking bores, and a handle on the other end of said portion operable to rotate said portion to thereby move said locking tip into and out of said locking bores.

10. A baby seat as recited in claim 9, including additionally, resilient means arranged to bias said handle in a direction to urge said locking tip into a selected one of said locking bores.

11. A baby seat as recited in claim 8, wherein said means for adjustably supporting the back rest comprises: a bracket secured to the rear side of said back rest above said projecting portion of said slide member, said bracket comprising: at least one generally vertically disposed flange, said flange having a generally vertical, elongated slot therein; a stop member pivotally connected to said flange above said slot; a slide bar, the lower end of said slide bar being pivotally mounted on said projecting portion of said slide members; and laterally projecting pin means on the upper end of said slide bar and received within said slot, the upper end of said slide bar being engageable wtih said pivoted stop member, and said slot being of sufficient length to permit said back rest to be pivoted forwardly over said seat and to disengage the upper end of said slide bar from said pivoted stop member.

12. A baby seat as recited in claim 11, wherein the pivoted stop member includes a forward edge and a bottom edge, disposed generally at right angles to each other, said stop member being pivoted at a point thereof near the upper end of said forward edge and spaced inwardly a distance therefrom, said distance being substantially less than the length of said forward edge, said pivoted stop member being movable by gravity when not in engagement with said slide bar from a first position, wherein said forward edge is presented toward said slot, to a second position, wherein said bottom edge is presented toward said slot.

13. A baby seat as recited in claim 16 including additionally means for securing said rail within said automobile, comprising: a plurality of legs secured at one end to said rail and adapted to have the other end secured to an automobile floor.

14. For use in an automobile including a pair of adjacent, spaced front seats having forwardly swingable back portions, a baby seat structure for mounting between said spaced front seats and designed so as to not interfere with the operation of said back portions of said front seats, said baby seat structure comprising: a rail to be secured between the adjacent sides of said spaced front seats, with the longitudinal axis of said rail extending generally parallel with said adjacent sides of said spaced front seats; seat means including a seat portion, and a slide member fixed to said seat portion and mounted upon said rail for sliding movement therealong; a back rest pivotally connected along its lower edge directly to the rear of said seat portion, and arranged to pivot about an axis extending generally perpendicular to the longitudinal axis of said slide member, said seat means including a portion projecting rearwardly beyond said lower edge of said back rest; releasable locking means between said seat means and said rail operable to positively lock said seat means in different positions along said rail, said seat means being removable by sliding it off one end of said rail when said locking means is released; and means connected between said rearwardly projecting portion of said seat means and said back rest for supporting said back rest in at least one rearwardly tilting, stationary angular position relative to said seat portion and arranged so that said back rest can freely tilt forwardly into at least a partially overlying position with respect to said seat portion, whereby to permit free forward swinging of said back portions of said front seats.

15. A baby seat, comprising: a rail; a seat; a back rest pivotally connected along its lower edge with the rear edge of said seat; a slide member secured to the underside of said seat and mounted upon said rail for sliding movement thereon, said slide member projecting beyond the rear edge of said seat; and means between said slide member and said back rest, said means being adjustable to support said back rest in any one of a plurality of angular positions relative to said seat, and being arranged to permit said back rest to be freely pivoted forward over said seat, said means including: at least one generally vertically disposed flange mounted on the rear side of said back rest, said flange having an elongated slot therein; a slide bar, the lower end of said slide bar being pivotally mounted relative to said projecting portion of said slide member; pin means projecting from the upper end of said slide bar and received within said slot; and a stop member pivotally mounted on said flange above said slot and engageable with the upper end of said slide bar.

16. For use in an automobile including a pair of adjacent, spaced front seats having forwardly swingable back portions, a baby seat structure for mounting between said spaced front seats and designed so as to not interfere with the operation of said back portions of said front seats, said baby seat structure comprising: a rail to be secured between the adjacent sides of said spaced front seats, with the longitudinal axis of said rail extending generally parallel with said adjacent sides of said spaced front seats; a seat; a back rest pivotally connected along its lower edge directly to the rear edge of said seat; a slide member fixed to the underside of said seat and extending parallel with the longitudinal axis thereof, a portion of said slide member projecting rearwardly from said seat, said slide member being mounted upon said rail for sliding movement therealong; releasable locking means between said seat and said rail operable to positively lock said seat in different positions along said rail, said seat being removable by sliding it off one end of said rail when said locking means is released; and means connected between said rearwardly projecting portion of said slide member and said back rest for supporting said back rest in any one of a plurality of rearwardly tilting, stationary angular positions relative to said seat and arranged so that said back rest can be pivoted freely forward over said seat from any rearward position thereof, whereby to permit free forward swinging of said back portions of said front seats.

17. For use in an automobile including a pair of adjacent, spaced front seats having forwardly swingable back portions, a baby seat structure for mounting between said spaced front seats and designed so as not to interfere with the operation of said back portions of said front seats, said baby seat structure comprising: a rail to be secured between the adjacent sides of said spaced front seats, with the longitudinal axis of said rail extending generally parallel with said adjacent sides of said spaced front seats; a seat; a back rest pivotally connected along its lower edge to the rear edge of said seat; a slide member fixed to the underside of said seat and extending parallel with the longitudinal axis thereof, said slide member being mounted upon said rail for sliding movement therealong; releasable locking means between said seat and said rail operable to positively lock said seat in different positions along said rail, said seat being removable by sliding it off one end of said rail when said locking means is released; means between said slide member and said back rest for supporting said back rest in any one of a plurality of rearwardly tilting, stationary angular positions relative to said seat and arranged so that said back rest can be pivoted freely forward over said seat from any rearward position thereof, whereby to permit free forward swinging of said back portions of said front seats; and means for securing said rail within said automobile, comprising: a plurality of clamps, each including a pair of sections secured at one end to said slide rail, the opposite ends of said sections being turned inwardly to be engaged over the lateral edges of a lid of a console positioned between the front seats of an automobile.

References Cited by the Examiner

UNITED STATES PATENTS

| | | | |
|---|---|---|---|
| 974,287 | 11/10 | May | 5—75 |
| 1,039,780 | 10/12 | Morgan | 297—232 |
| 1,111,685 | 9/14 | Allison | 297—377 |
| 1,470,004 | 10/23 | Gahm | 297—63 |
| 1,824,193 | 9/31 | Bovingdon | 248—429 |
| 1,852,012 | 4/32 | Hose | 297—377 |
| 2,508,769 | 5/50 | Osbon et al. | 297—378 |
| 2,546,268 | 3/51 | Legris | 248—429 |
| 2,868,273 | 1/59 | Barrett | 248—377 |
| 3,050,333 | 8/62 | Smith et al. | 297—248 |

FOREIGN PATENTS

| | | |
|---|---|---|
| 213,721 | 2/61 | Austria. |
| 957,909 | 2/50 | France. |
| 1,225,748 | 7/60 | France. |
| 508,017 | 6/39 | Great Britain |
| 607,142 | 8/48 | Great Britain. |
| 164,072 | 12/33 | Switzerland. |

FRANK B. SHERRY, *Primary Examiner.*